Figure 1:
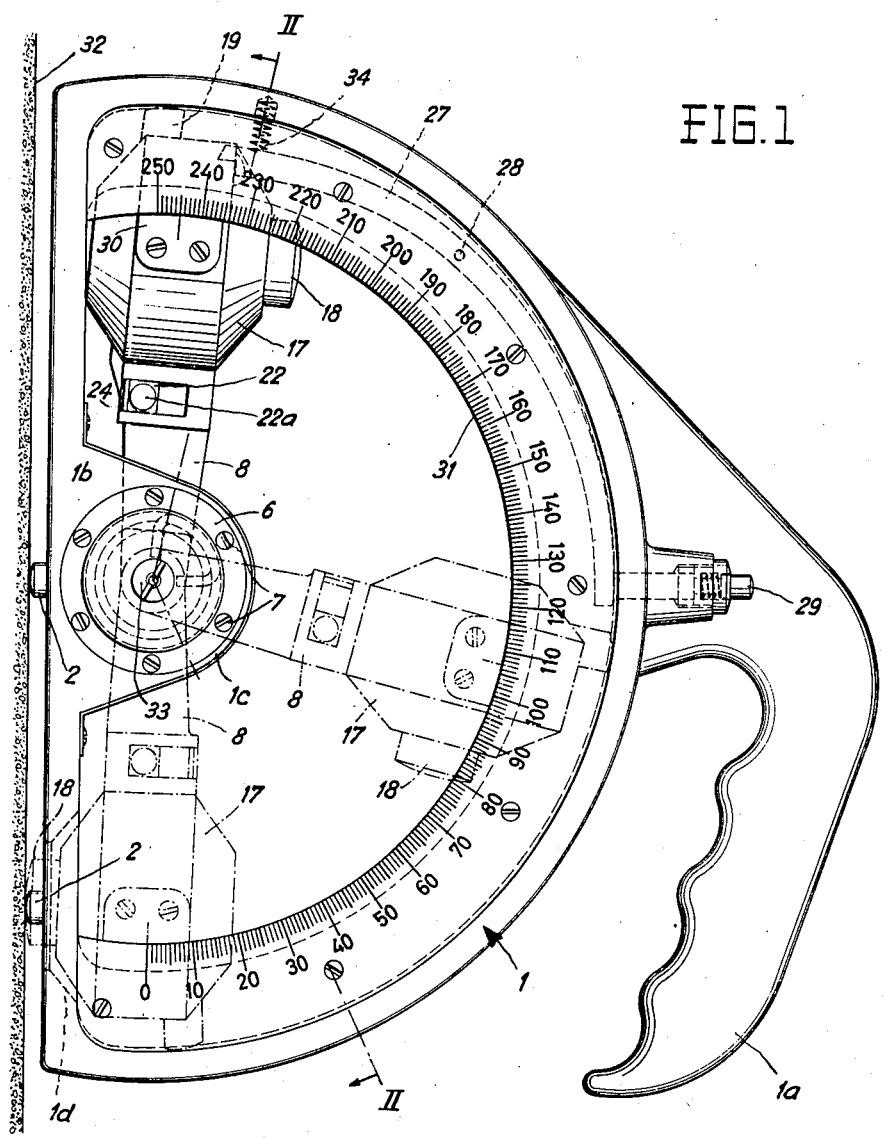

Aug. 17, 1965   E. O. SCHMIDT   3,200,639
HARDNESS TESTER
Filed Jan. 30, 1962   5 Sheets-Sheet 1

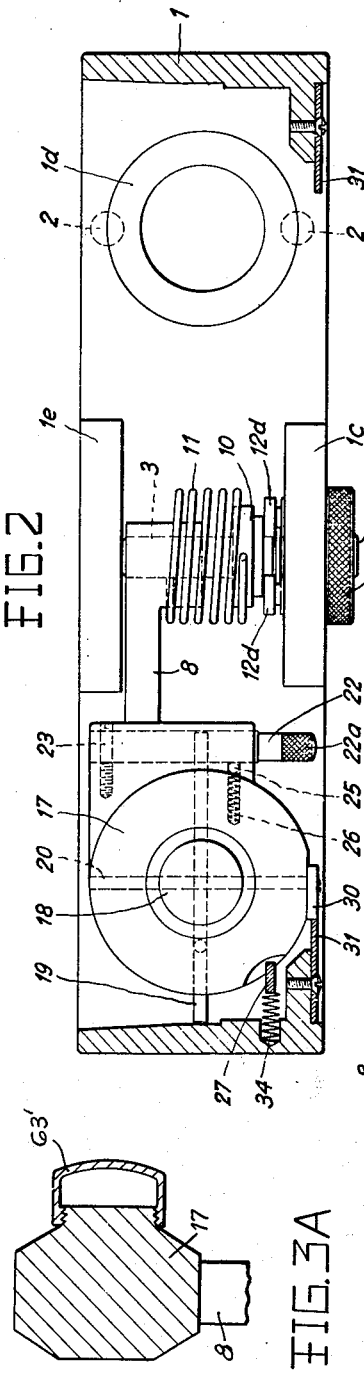
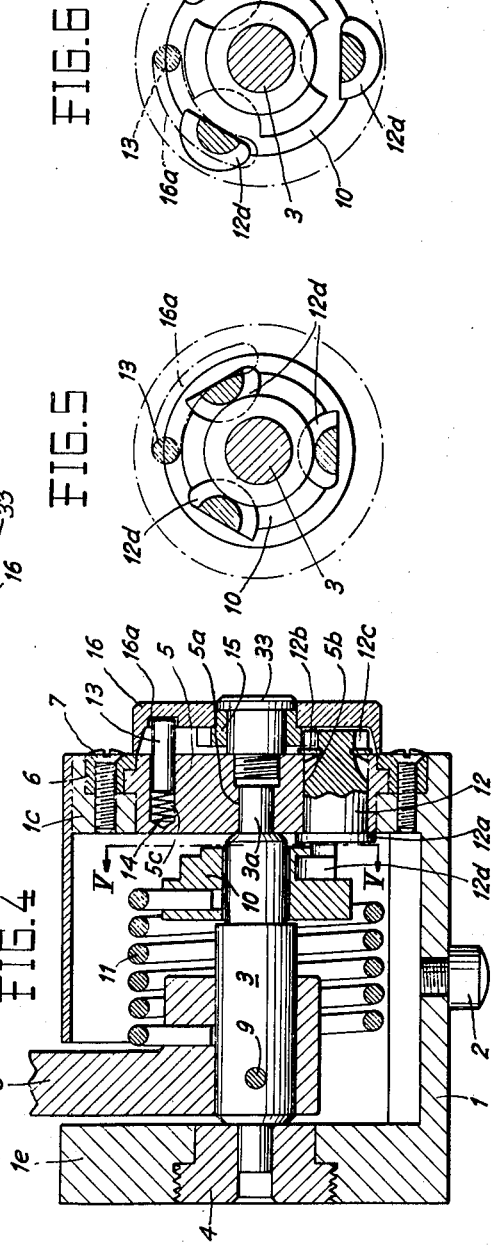
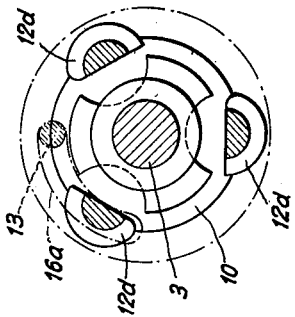
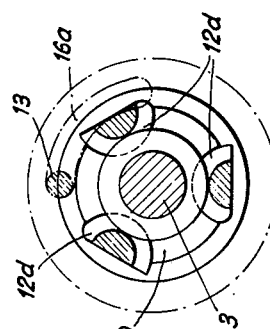

Aug. 17, 1965 E. O. SCHMIDT 3,200,639
HARDNESS TESTER
Filed Jan. 30, 1962 5 Sheets-Sheet 3

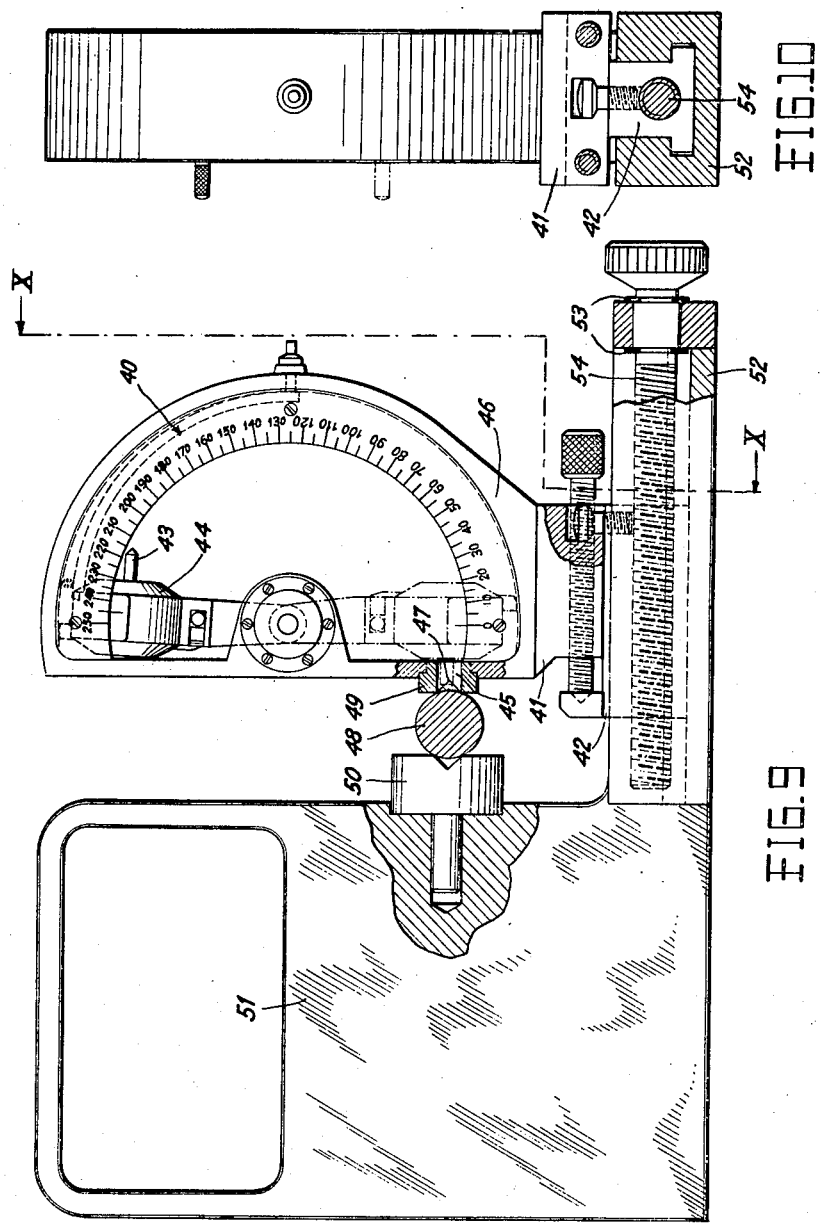

United States Patent Office 3,200,639
Patented Aug. 17, 1965

3,200,639
HARDNESS TESTER
Ernst O. Schmidt, Leimenstrasse 44, Basel, Switzerland
Filed Jan. 30, 1962, Ser. No. 169,968
Claims priority, application Germany, Jan. 31, 1961,
Sch 29,144
15 Claims. (Cl. 73—79)

For testing the strength of concrete embodied in a structure, two possibilities are know today. Either test cubes are made from the concrete assuming that their compressive strength coincides with that of the concrete used in the structure, the cubes being then subjected to compression tests all the way to destruction, or the surface hardness of the structure itself is tested with the aid of a suitable hardness tester.

For testing structural steel to be embodied in a structure, different possibilities are available. The investigation by means of a hardness tester is comparatively simple. Testers known so far, however, are mostly expensive units which have not been constructed for use on the building site but rather for the purpose of carrying out laboratory tests by a skilled staff.

My present invention relates to a hardness tester that not only may be adapted either for testing the surface or macro-hardness of large-size objects such as buildings or for macro-testing comparatively small objects or objects small when measured in one direction, such as a rod, but which may be used for both these purposes. In no case is required special training for its manipulation.

The hardness tester disclosed by my invention comprises a bouncing hammer destined to strike, from a certain initial position and with predetermined energy, the surface to be tested directly or indirectly. The macro-hardness is determined from the rebound of the hammer.

According to the invention, the hardness tester is characterized by the fact that said hammer is pivoted on an axle that is parallel to the surface to be tested. Further, said hammer is provided with disengageable clamping or locking means engaged by the impact or percussion of the bouncing hammer and, when engaged, prevents a movement of the hammer in the striking direction.

The hardness tester is further characterized in that its housing is D-shaped, the curved inside wall serving as a braking track for the locking means.

A still further feature of the disclosed hardness testers is the provision of a spring which, as desired, may be connected to the bouncing hammer or be released therefrom, according to whether the hammer shall exert the blow under spring load or by gravity.

For carrying into effect the macro-hardness test on specimens which cannot be tested any more with Shore's hardness testing method with efficient accuracy, as the test result in this method is dependent on the thickness of the specimen, an elastic element has to be used for transmitting the energy from the bouncing hammer to the specimen and back, so as to avoid such dependency. The elastic deformability $\eta_s$ of such a transmission element is at least four times that, denoted $\eta_p$ of the specimen.

These deformabilities as well as the shape of the striking head of the transmission element have to be adjusted to each other so that with hardness values in the intermediate hardness range of the specimens to be tested, the plastic deformability $\vartheta_p{}^*$ of the specimen amounts from 50 to 150% of the sum of the elastic deformability of the specimen plus transmission element.

Such an apparatus, of course, may be used only for macro-hardness testing and not for micro-hardness testing, i.e., down to a gage or thickness of one millimeter or so in the case of iron and steel specimens for example.

Three alternatives of the invention are shown in the drawings, wherein

Figure 3:
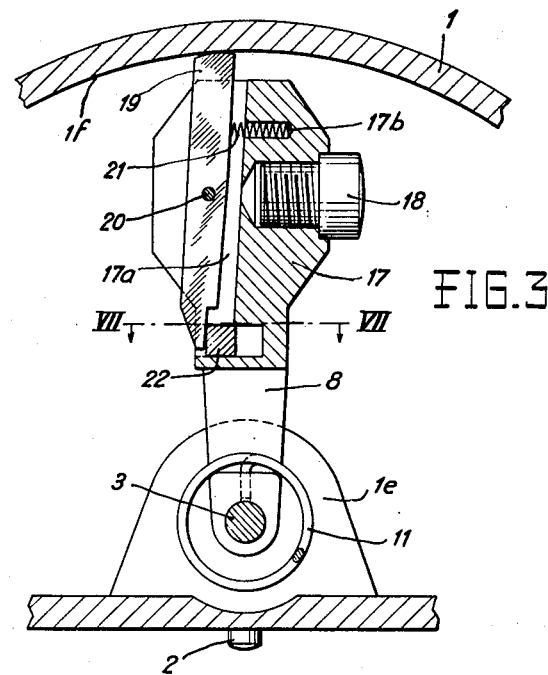
Figure 7:
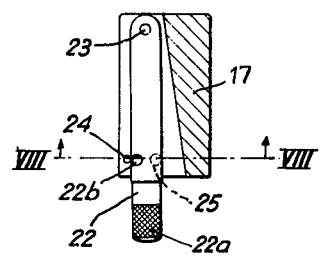
Figure 8:
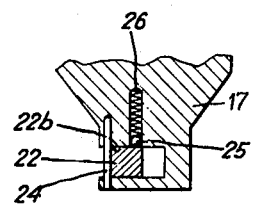
Figure 11:
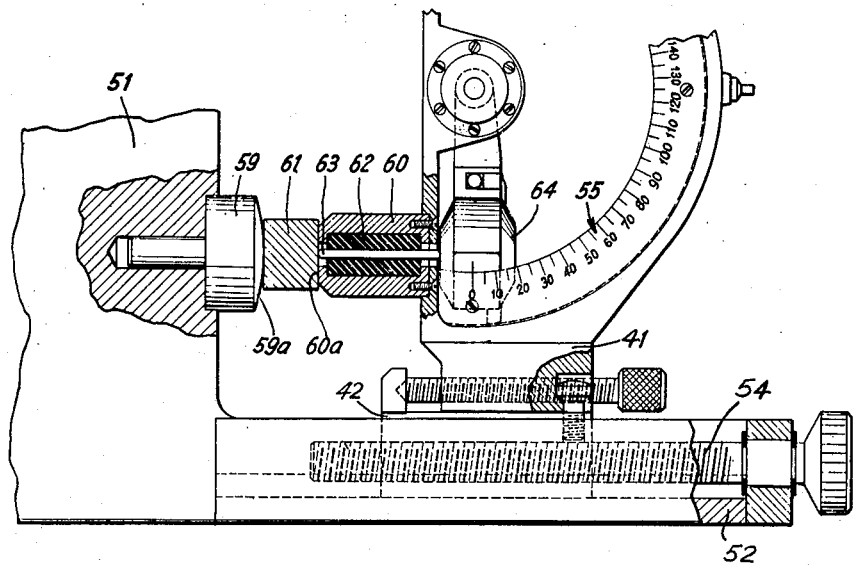
Figure 12:
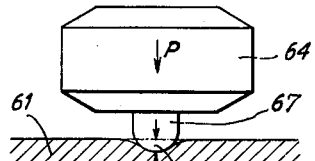
Figure 13:
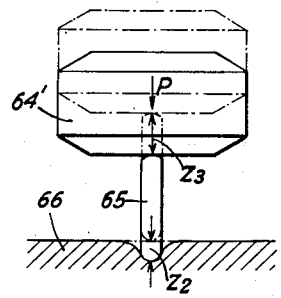
Figure 14:
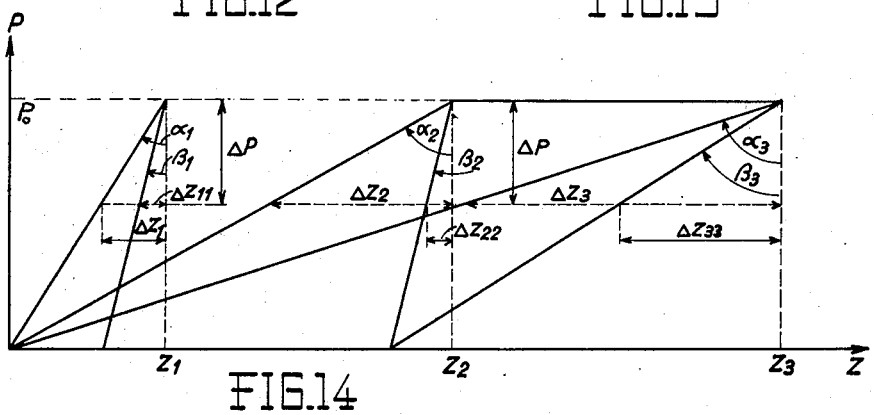

FIG. 1 is a side view of a first embodiment of a hardness tester according to the invention;
FIG. 2 is a section on line II—II of FIG. 1;
FIG. 3 shows a section through the hammer of the tester according to FIG. 1, in a plane at right angles to the pivotal axis;
FIG. 3A illustrates an alternative rebound hammer having a so-called box spring attached thereto;
FIG. 4 shows a longitudinal section through the pivotal axis of the hammer of FIG. 3;
FIGS. 5 and 6 depict details of the means for attaching and detaching the spring, both in a section on line V—V of FIG. 4;
FIG. 7 is a section on line VII—VII of FIG. 3;
FIG. 8 shows a section on line VIII—VIII of FIG. 7;
FIG. 9 shows a side view of a second embodiment;
FIG. 10 is a view on line X—X of FIG. 9;
FIG. 11 is a side view of a portion of a third embodiment;
FIGS. 12 and 13 show bouncing hammers in the act of striking specimens; and
FIG. 14 illustrates the relation between the various deformabilities.

The hardness tester shown in FIGS. 1 to 8 comprises a housing generally denoted by 1, having D-shape and provided with a handle 1a. Its plane set-down face 1b has an opening 1d and legs 2 which ensure a proper set-down of the tester on a surface to be tested. In two eyes 1c and 1e are secured the bearing bushings for a pivot 3. In eye 1e is screwed a bearing bushing 4, whilst in eye 1c is held a bearing bushing 5 by means of a holding ring 6 which is secured by screws 7. To pivot 3 is fixed a hammer shank 8 by a pin 9, whilst a sleeve 10 is seated in freely revolvable manner on pivot 3. Hammer-shank 8 and sleeve 10 are interconnected by a helical spring 11.

As may be seen in particular from FIGS. 4 to 6, bushing 5 comprises a central bore 5a for a journal 3a of pivot 3, and three other bores 5b for pins 12, and a bore 5c for a locking pin 13 which is loaded by a spring 14. Each of the three pins 12 is axially held by a shoulder 12a and a ring 12b. Each pin 12 at one end comprises a rim gear 12c which meshes with a pinion 15 that in turn is fixed to an outwardly knurled handwheel 16 which is secured by a screw 33 and of which the turning range is limited by the locking pin 13 engaged in a slot 16a. The three pins 12 each comprise on their ends opposite to rim gears 12c a semi-annular shoulder 12d. By turning handwheel 16, the shoulder 12d may be engaged in, or disengaged from, respective recesses of sleeve 10. Sleeve 10 which is freely rotatable on pivot 3 may thus be rigidly connected to, or detached from, the non-rotatable bearing bushing 5.

To the end of hammer shank 8 is secured a hammer 17. The outside of a screwed-in striking member 18 serves as a striking face. A clamping lever 19 is pivotally mounted on a pin 20 in a milled recess 17a of the hammer 17. A spring 21 housed in a bore 17b of hammer 17 tends to swing lever 19 counter-clockwise (as viewed, for example, in FIG. 3). Lever 19 is so formed and dimensioned that its end which contacts a cylindrical inside face 1f of housing 1 acts as clamping lever and permits hammer 17 to swing counter-clockwise but prevents same from swinging clockwise. This clamping action of lever 19 may be rendered inoperative by way of an arm 22 pivoted on a pivot 23, if and when said arm occupies the position shown in FIGS. 3, 7 and 8. In such position, arm 22 abuts against a pin 24, whilst in its other terminal position, i.e. in the one in which it does not hinder the action of the clamping means, said arm is held fast by a ball 25 which, being loaded by a spring 26, is seated in a recess 22b of the arm. The free end of arm 22 is formed as a handle 22a.

For locking the hammer in its initial position for the purpose of effecting a measurement, there is provided a curved arm 27 (FIGS. 1 and 2) loaded by a spring 34 and pivoted to housing 1 on a pivot 28. Arm 27 is actuable by a spring-loaded knob or pin 29 (FIG. 1). In order to be able, after an impact test, to read the hammer position, the hammer 17 is provided with an index mark 30 (FIG. 1) and the housing 1 carries a corresponding semicircular scale 31 from which then may be read the rebound angle of hammer 17. From said angle may be determined the cube compression strength with the aid of a diagram.

If it is desired to measure the surface hardness on a vertical wall of a concrete structure, for example on a wall 32 in FIG. 1, handwheel 16 (FIG. 2) is turned counter-clockwise until the shoulders 12d have been swung entirely out of the range of the recess in sleeve 10 to render the latter freely rotatable with respect to housing 1. Hammer 17 then is moved to the position shown in FIG. 1 in solid lines, by swinging same counter-clockwise on handle 22a. In this position of arm 22, adjacent pin 24 the clamping means is disengaged. Hammer 17 is held fast in its terminal position by locking arm 27 (FIGS. 1 and 2).

The hardness tester is then set down with its feet 2 on wall 32, and knob 29 is pressed down, whereby locking arm 27 is activated and hammer 17 is released to turn clockwise by gravity about pivot 3 which is parallel to wall 32, until striking member 18 strikes against the wall through an opening 1d of housing 1 or against an intermediate piece (not shown) mounted on the wall surface, whereby arm 22 springs into its other terminal position, (shown in FIG. 1 in dash-and-dot lines), whilst the entire hammer rebounds in counter-clockwise sense through a certain angle in accordance with the hardness of the wall. In this new position which corresponds to the rebound energy and in which the hammer in FIG. 1 also is shown in dash-and-dot lines, the hammer is immobilized since the clamping means has been cut in by the swinging movement of arm 22 and said means prevents the hammer from swinging back in the clockwise striking direction.

For the next measurement, the hammer is seized by handle 22a and swung back to the initial position previously described, whereby the clamping means is put out of action. Now, the impact test may be repeated at some other spot of the vertical wall.

Whilst for measuring the rebound energy of vertical faces with the aid of the present tester, gravity is used, spring force is used for measurement on horizontal faces, irrespective of whether we deal with the underside of a ceiling or the topside of a floor. In such case, after hammer 17 has been moved to the position in which the semicircular shoulders 12d are situated in front of the respective recesses of sleeve 10, handwheel 16 is turned clockwise until sleeve 10 is rigidly connected to bearing bushing 5.

The initial tension of the spring 11 shall be so calculated that when setting the tester down on or below a horizontal face, striking member 18 contacts the surface to be tested without, however, bearing down thereon. By swinging hammer 17 counter-clockwise, to which end the hammer is seized on handle 22a also, it is moved to the initial position already described. Pressing down knob 29, the hammer is released and turns about pivot 3, strikes against the face to be tested, rebounds for a certain amount and stays fixed there, since arm 22 has moved on the impact and, thus, has cut in the clamping means. The spring constant of spring 11 is suitably so calculated that the impact energy in tests on horizontal faces by spring means is equal to that on vertical walls without spring means.

The form of invention described above, in which the hammer is movable about a pivot, practically involves no source of error, since there are no rubbing parts. Such a tester, therefore, is partcularly well suited for testing relatively soft materials such as expanded concrete or low-strength concrete. The invention, however, is not restricted to embodiments comprising a pivotable hammer, but may be readily used in tester comprising a linearly movable hammer. In place of a clamping means, other auxiliary means may be used such as a drag pointer.

Whilst the embodiment described above essentially serves for measuring the hardness of larger objects, the variant shown in FIGS. 9 and 10 illustrates a hardness tester suitable for measuring the hardness of small objects or objects of slight thickness. A housing of the testing unit proper is designated by 40. This tester differs from the first one shown in FIGS. 1 to 8, by three things. First, a housing extension 46 comprises a leg 41 screwed fast to a carriage 42; second, a striking member 43 of a hammer 44 is formed somewhat different than striking member 18 of hammer 17, and third, an opening 45 in housing 46 is not only adapted to this striking member 43 but comprises an insert 49 which has a groove 47 to allow a bar-like test specimen 48 to be clamped between this insert 49 and a counter-piece 50 inserted in an anvil 51. Carriage 42 is movably mounted in a further leg 52 that is integral with an anvil 51 and is reciprocable by means of a set-screw 54 that is secured by two locking rings 53.

A hardness test is carried out on the round bar 48 in a similar manner as on a plane face. Said bar first is clamped between insert 49 and counterpiece 50. Then hammer 44 which before has been swung upwardly, in counter-clockwise direction is dropped so that bouncing pin 43 hits the test specimen and the hammer rebounds by a certain angle corresponding to the hardness of the specimen and then stands still.

This second tester is suited, of course, not only for testing the hardness of reinforcing irons on construction sites but also may be used in many other places such as in shops for testing the hardness of lathe tools and of other tools. It also is possible to dismount the testing unit housing proper 40 from carriage 42 and to use it alone for testing the hardness of larger objects, as has been described with the aid of the first form of the invention. The conventional means by which the housing portion 46 and its leg 41 are secured to the carriage 42 have been illustrated in FIGS. 9-11 but are not described herein.

The hardness tester shown in FIGS. 9 and 10 may be further altered, for example as shown in FIG. 11. A housing 55 of the testing unit, which is only partly shown in the drawing, is movably held by means of the screw 54 in the leg 52 fixed to the anvil 51. The structure is similar to that shown in FIGS. 9 and 10. In the anvil 51 is inserted an anvil extension or counterpiece 59 which has a convex surface 59a, in the case of testing a specimen having a plane face. If, however, the specimen itself has a convex surface, i.e. for example a spherical or cylindrical surface, it is convenient to use an anvil extension having a slightly concave area of which the radius of curvature, however, has to be greater than that of the specimen. To housing 55 of the tester is secured a guide and chuck extension 60. Through the end face 60a of this extension, a specimen 61 is pressed against anvil extension 59 by a tightening screw 58. In chuck extension 60 is inserted a piece 62 of soft rubber or some other elastic material, in which a striking or mission pin 63 is so secured that its end adjacent anvil extension 59 projects approximately 0.1 millimeter beyond end face 60a if the latter does not abut against a specimen. In this manner, pin 63 in view of its short paths of movement is mounted practically free from forces, i.e. floating so to say.

Pin 63, of course, is of such length that a hammer 64 in striking hits the pin and not on housing 55. Hammer 64 conveniently is made and mounted as shown in and described with reference to hammer 44 of FIGS. 3, 7 and 8 or hammer 17 of FIGS. 1 and 3. Obviously, transmission pin 63, or at least the ends thereof, have to be harder than specimen 61 so that a couple of thousand tests may be carried out without changing its shape.

A further requirement is—and this is an essential and novel feature of the invention, unknown so far—that the elastic deformability of the testing pin has to be several times, but at least twice, andn preferably four times, that of the specimen. Further, the deformability values, as well as the shape of the striking head of the transmission element, have to be correlated to each other so that, in the case of a hardness in the intermediate range of the specimens to be tested, the plastic deformability $\vartheta_p^*$ of the specimen amounts to between 50% and 150% of the sum of the elastic deformability values of specimen and transmission element.

The elastic deformability $\eta_s$ of pin 63 is equal to $$\frac{l}{F.E}$$

wherein $l$ is the pin length, F is the cross-sectional area of the pin, and E is the modulus of elasticity of the pin material.

The elastic deformability $\eta_p$ of the specimen and the plastic deformability $\vartheta_p$ thereof, as becomes apparent when using a common bouncing hammer, i.e. when applying the Shore hardness test, are determined as follows, reference being had to FIGS. 12 and 14. P designates the force with which the hammer 64 of a rebound hardness tester hits the specimen 61. As a matter of example, the hammer may be that of the Shore hardness tester or of a hardness tester as described above which comprises a conventional striking face or tip 67. $Z_1$, in turn, is the depth of penetration of hammer tip 62 resulting from the force $P_0$. Thus a depth of penetration $\Delta Z_1$ corresponds to a force $\Delta P$. When, now, the force P is reduced by an amount $\Delta P$, the depth of penetration is reduced by $\Delta Z_{11}$ from which may be determined the total deformability $\eta_p + \vartheta_p$ as well as the elastic deformability $\eta_p$ of the specimen.

$$\eta_D = tg\beta_1 = \frac{\Delta Z_{11}}{\Delta P}$$

and $$\vartheta_p + \eta_D = tg\alpha_1 = \frac{\Delta Z_1}{\Delta P}$$

As may be readily seen, the plastic deformability $\vartheta_p$ of the specimen depends on the shape of the striking head.

FIG. 13 shows a hammer 64' of which the striking energy is transmitted through a transmission pin 65 to a specimen 66, the striking head of the transmission pin (which serves as transmission means) having a substantially smaller radius of curvature than hammer tip 67 of FIG. 12. The depth of penetration resulting from a load $P_0$ is now $Z_2$, this being greater than $Z_1$. When reducing the load by an amount $\Delta P$, the depth of penetration $Z_2$ is reduced by an amount $\Delta Z_{22} \simeq \Delta Z_{11}$. Thus there remains $$\eta_D = tg\beta_1 \simeq tg_2\beta = \frac{\Delta Z_{22}}{\Delta P}$$

whilst the plastic deformability $\vartheta_p$ of the specimen is changed to $\vartheta_p^*$, whereby $$\vartheta_p^* + \eta_D = tg\alpha_2 = \frac{\Delta Z_2}{\Delta P}$$

Considering now, with reference to FIGS. 13 and 14, the path $Z_3$ which hammer 64' covers during the strike proper and which is greater than the path covered by the lower pin tip, owing to the elastic change of length of pin 65, we obtain $$\frac{\Delta Z_3}{\Delta P} = tg\alpha_3 = \vartheta_D^* + \eta_D + \eta_s$$

and $$\frac{\Delta Z_{33}}{\Delta P} = tg\beta_3 = \eta_D + \eta_s$$

whereby $\vartheta_s$ is the said elastic deformability of the pin.

When it is desired to produce a macro-tester for testing a certain group of materials of which the reading—in contradistinction to that of the Shore unit—is independent of the gage or thickness of the test specimen, which thickness of course shall not be less than the lower limit of about one millimeter set for macro-hardness testing, first of all the material for the transmission pin is chosen so that the hardness of the pin is greater than that of the hardest of all the specimens.

In case that materials are available which have different moduli of elasticity, a material is selected which has as low a modulus of elasticity as possible, and the pin is given a small cross-section, but care is taken to ensure the requisite buckling strength. Thus, for example, a steel pin may be used which has been hardened either throughout or at its ends only and which has a thickness of two millimeters and a length of three centimeters. Of course, a pine made of a hard metal or having hard-metal ends could be used. Length and cross-section of the pin then are chosen so that the elastic deformability $\eta_s$ of the pin resulting therefrom is at least twice, and preferably four times, that of the test specimen, $\eta_p$. The shape of the striking head, i.e. the pin end adjacent the specimen then is rounded so that with a hardness in the intermediate hardness range of the test specimens, the plastic deformability $\vartheta_p^*$ of the specimen is from 50 to 150% of the sum of the elastic deformability of specimen plus transmission element. Thus, there shall be:

$$\eta_s \geq 2\eta_p, \text{ preferably } \eta_s \geq 4\eta_p$$

and $$\vartheta_p^* = (1.0 \pm 0.5) \cdot (\eta_s + \eta_p)$$

In place of a pin, a so-called box spring 63' may be used as an elastic transmission means, the box being secured to the bouncing hammer 17 (see FIG. 3A). A striking pin may be formed on the box spring, for example, by a hard-metal or a diamond tip.

When carrying out a hardness test, specimen 61 is clamped by means of screw 58 with a pressing force at least three times the striking force occurring in the test, which may be readily carried out by the use of a corresponding wrench that also may be formed as a moment wrench. The test itself is carried out just as described above with reference to the other embodiments.

What I claim as new and desire to secure by Letters Patent, is:

1. A rebound-type hardness tester, comprising, in combination, a housing having a wall adapted to be positioned adjacent the surface of a specimen with an outer face of said wall directed toward said surface, a hammer pivotally attached to said housing wall for swinging movement toward said surface of a specimen to be tested, from an initial position toward a contact position and back to a rebound position commensurate with the hardness of said specimen, the pivotal axis of said hammer being substantially parallel with said face of said wall, an arcuate scale on said housing carrying hardness graduations and extending along a circle whose center is in said axis and whose radius is slightly larger than a circular arc described by said hammer during swinging thereof, said scale being situated beside said hammer during at least part of its swinging movement, an index rigid with said hammer and swingable therewith along said scale, and clamping means carried by said hammer for swinging movement therewith and engaging said housing for preventing movement of said hammer from said rebound position toward said contact position once it has moved from said initial position to said contact position during a test, so that a reading taken between said scale and said index at said rebound position will give a direct hardness indication.

2. A hardness tester according to claim 1, wherein said housing has the shape of a D the straight edge of which is adapted to be placed against said surface, said scale being arranged along at least a portion of the curved edge of the D, the inside wall of said curved edge providing a brake path for said clamping means, and further comprising locking means carried by said housing and engaging said hammer for optionally immobilizing said hammer in said initial position and releasing the same for swinging toward said contact position.

3. A hardness tester according to claim 1, wherein said clamping means includes movable lever means adapted normally to inactivate said clamping means, and to render the latter effective upon said hammer reaching said contact position, on effect of kinetic energy resulting from the impact against said surface.

4. A hardness tester according to claim 3, wherein said lever means is in the form of a handle adapted for moving said hammer manually to said initial position in which said clamping means is inactivated.

5. A hardness tester according to claim 4, wherein said lever means includes a pivoted clamping lever one portion of which is acted upon by handle while another portion is adapted to engage the inside wall of said housing which provides an arcuate brake path for said other portion.

6. A hardness tester according to claim 4, further comprising biasing means optionally connectable between said housing and said hammer so as to swing the latter with a predetermined force against said surface when said biasing means is connected.

7. A hardness tester according to claim 6, wherein the weight of said hammer and said force of the biasing means have predetermined values chosen so that the striking energy of said hammer, acting on said surface at right angles in the connected condition of said biasing means and with the surface arranged horizontally, is substantially the same as that acting on said surface at right angles in the disconnected condition of said biasing means and with the surface arranged vertically, gravity alone being relied on in the latter case for swinging said hammer against said surface.

8. A hardness tester according to claim 6, wherein the weight of said hammer and said force of the biasing means have predetermined values chosen so that in the connected condition of said biasing means and with said surface arranged horizontally, said weight is substantially counterbalanced by said force owing to an initial tension of said biasing means.

9. A hardness tester according to claim 8, further comprising anvil means connected to said housing for testing specimens having small dimensions in at least one direction, and means for moving said anvil means relative to said pivotal axis of the hammer for securely clamping said specimens thereagainst.

10. A hardness tester according to claim 9, further comprising means for disconnecting said anvil means from said housing so that the hardness tester may be used for testing specimens with optional dimensions.

11. A hardness tester according to claim 1, further comprising an elastic transmission element interposable between said hammer and said specimen for transmitting energy therebetween during the test, the elastic deformability of said element being at least twice that of said specimen.

12. A hardness tester according to claim 11, wherein said element has a striking head with a shape owing to which the plastic deformability of said specimen ranges between 50 and 150% of the sum of the elastic deformability values of said specimen and said striking head, when measuring hardness values in the intermediate hardness range of said specimen.

13. A hardness tester according to claim 11, wherein said elastic deformability of the element is at least four times that of said specimen.

14. A hardness tester according to claim 13, wherein said element is in the form of a pin secured to said hammer in a manner practically free from forces, whereby a floating connection is provided between said hammer and said specimen.

15. A hardness tester according to claim 13, wherein said element is in the form of a box spring secured to said hammer, whereby a sensitive connection is provided for extremely soft specimens.

References Cited by the Examiner
UNITED STATES PATENTS
2,207,502   7/40   Zomboni _____ 73—79

RICHARD C. QUEISSER, *Primary Examiner.*